June 20, 1950          M. WHITED          2,512,125
AIR COMPRESSOR MOUNTING FOR TRACTORS
Filed July 19, 1946          2 Sheets—Sheet 1
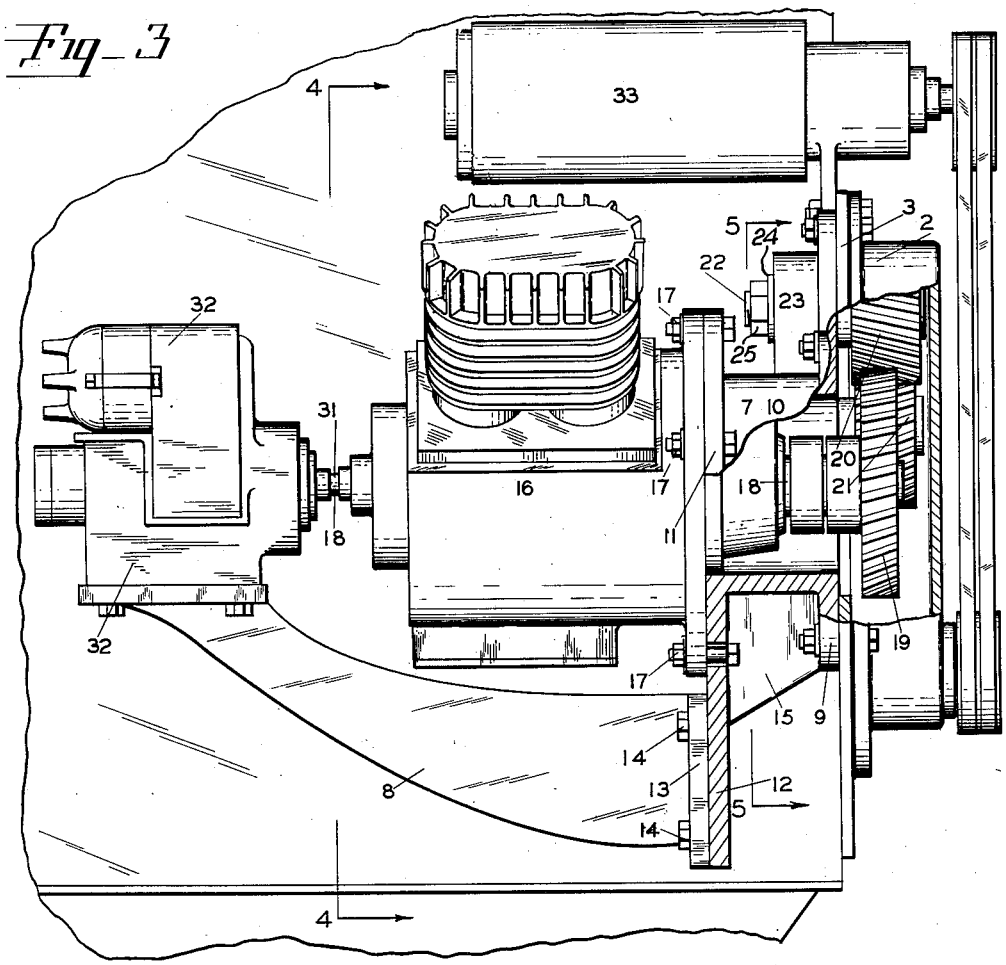
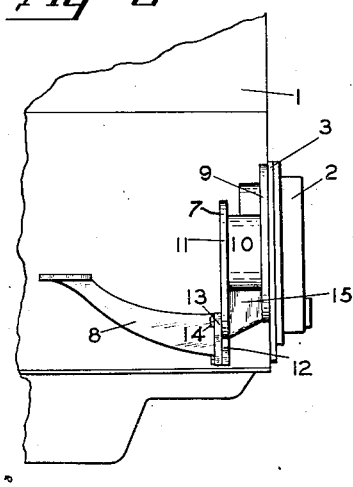
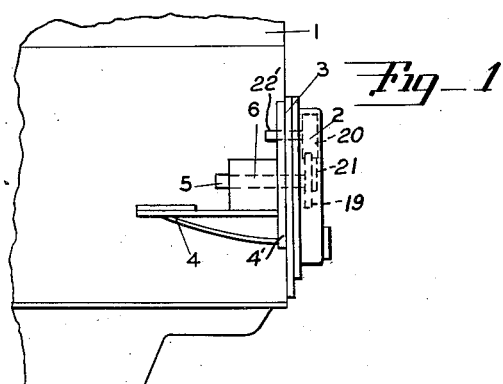
INVENTOR.
MILO WHITED
BY
ATTORNEY June 20, 1950          M. WHITED          2,512,125
AIR COMPRESSOR MOUNTING FOR TRACTORS
Filed July 19, 1946          2 Sheets-Sheet 2
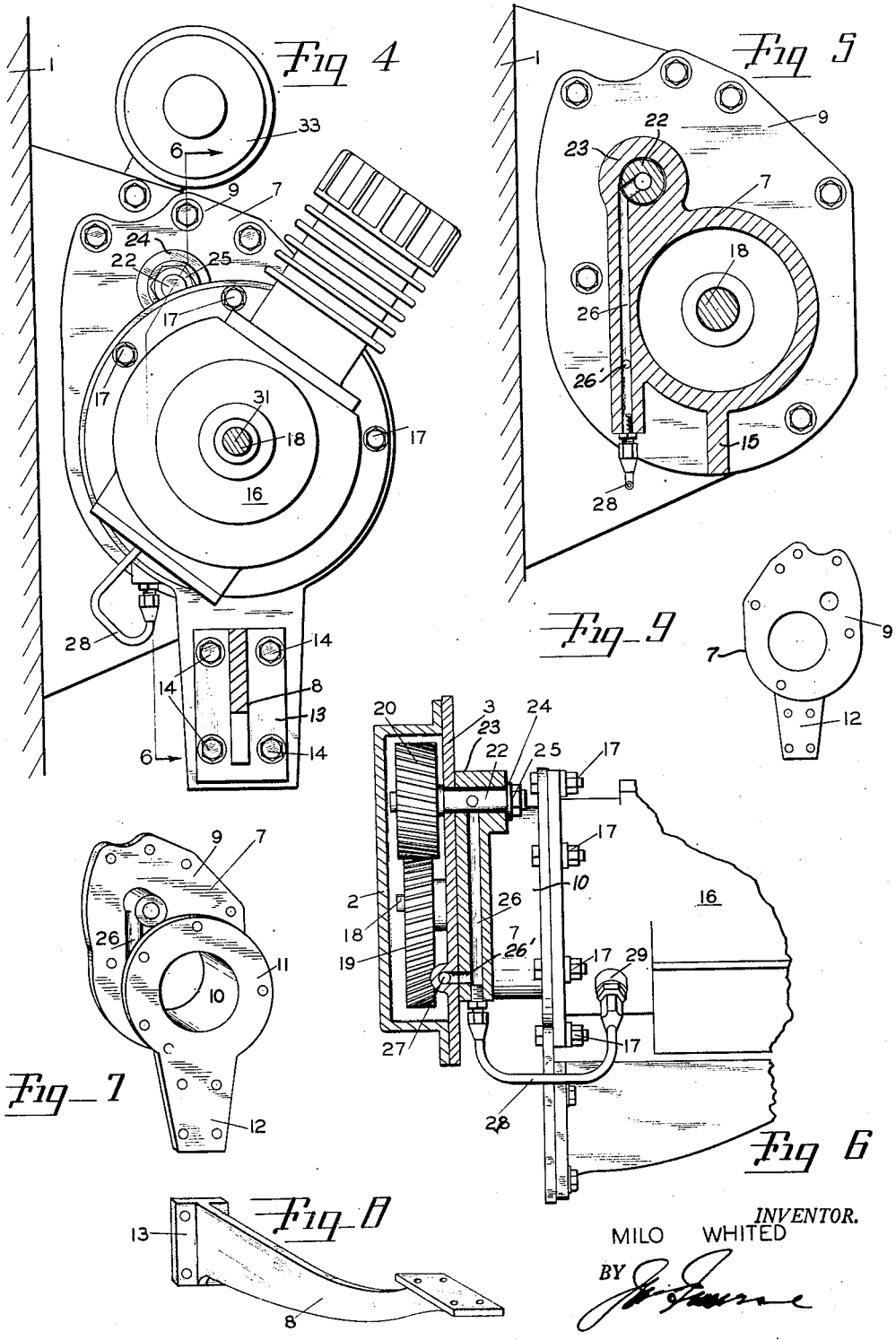
INVENTOR.
MILO WHITED
BY
ATTORNEY Patented June 20, 1950

2,512,125

UNITED STATES PATENT OFFICE 2,512,125

AIR COMPRESSOR MOUNTING FOR TRACTORS

Milo Whited, Centralia, Wash.

Application July 19, 1946, Serial No. 684,876

5 Claims. (Cl. 230—33)

1

This invention relates to improvements in air compressor mountings for tractors.

The primary object of the invention is to supply a unit mounting to tractors for supporting an air compressor without altering the tractor in any form.

A further object of the invention is to mount the unit mounting in line with the magneto mounting, shifting the magneto beyond the compressor which is at present located adjacent the timing gear case of the motor, the compressor receiving its drive from said timing gears.

Another object of the invention is to provide a mount for supporting the magneto in line with the compressor, said magneto being driven by the crank shaft of the compressor.

A still further object of the invention is to provide a pressure oil feed connection through the mount from the force feed oiling system to the compressor.

By the use of my new and improved compressor and magneto unit mount, the compressor and the magneto are driven directly from the timing gears without altering the gears in the motor.

In the mounting of my new and improved unit, there are no extra holes to drill and tap, nor any part of the engine to be altered, the present magneto mount is removed from the timing gear housing and my mount is replaced in the same location.

These and other incidental objects will be apparent in the drawings, specification and claims.

Referring to the drawings:

Figure 1 is a fragmentary view of the forward end of an engine showing the present magneto mount located thereon.

Figure 2 is a fragmentary view of the engine showing the magneto mount shown in Figure 1 replaced by my compressor and magneto unit mount.

Figure 3 is an enlarged fragmentary view of the engine, having the compressor and magneto installed on my new and improved mount.

Figure 4 is a fragmentary cross-sectional view of the engine, taken on line 4—4 of Figure 3, showing an end view in elevation of the compressor.

Figure 5 is a fragmentary cross-sectional view, taken on line 5—5 of Figure 3, of the engine and my unit mount.

Figure 6 is a cross-sectional view, taken on line 6—6 of Figure 4, of the engine timing gear case, part of my mount being shown in cross-section to particularly illustrate the compressor oiling system connected with the pressure oiling system of the engine.

Figure 7 is a perspective view of the compressor mount having the magneto mount removed therefrom.

2

Figure 8 is a perspective view of the magneto mount.

Figure 9 is an end view in elevation of the compressor mount showing the end opposite from that shown in Figure 7, and supporting one of the pinions of the timing gear train.

This invention is particularly adapted to tractor engines of the type wherein the magneto is supported by a bracket mounted to the timing gear casing and the magneto is operated by a gear of the timing gear train. This type of engine construction is employed in the International tractors which are manufactured by the International Harvester Company. Accordingly, in view of the wide popularity of the International tractors, I have shown my invention incorporated in an International tractor engine. It will be apparent, however, that the invention is equally applicable to any engine of this type.

Referring now to the drawings, the usual prior art construction is shown in Fig. 1 as comprising an engine 1, having the usual timing gear housing 2, which is supported by the timing gear supporting plate 3 fixed to the front end of the engine cylinder block. The prior art magneto mount is indicated at 4 in Figure 1 and is bolted by means of a flange 4' to the timing gear plate 3. A magneto drive shaft 5 is journalled within suitable bearings located within the housing 6, the opposite end of the shaft having a gear 19 keyed thereto and driven by an idler gear 20 from the timing gear 21. The idler gear 20 is mounted on a shaft 22' that is supported by the mount flange 4'.

My new and improved compressor and magneto mount, as shown in Fig. 2, consists of a main body or frame 7, and a bracket 8 removably attached thereto. The mount 7 consists of a flange 9 formed on one end of the tubular body portion 10 and a flange 11 formed on the opposite end of this tubular portion. The flange 9 is substantially identical to the flange 4' of the prior art mount and, in like manner, is adapted to be bolted to the timing gear plate 3. The bottom of the flange 11 extends downwardly to form an arm 12 which is reinforced by a web or gusset 15. The arm 12 is adapted to support the magneto bracket 8, which has a flange 13 for engaging the face of the supporting arm 12 and being secured thereto by the bolts 14.

As shown in Fig. 3 the compressor 16 is bolted to the flange 11 by the bolts 17 and has a shaft 18 which, as also shown in Fig. 6, extends through the tubular body 10 of the compressor mount 7. After the compressor and the mount are bolted to the timing gear frame 3 the gear 19 (Figs. 3 and 6) is keyed to the compressor shaft 18 in the same manner that it was mounted on the prior art magneto shafts. This gear 19 is driven by the idler gear 20, which in turn is driven by the timing gear 21 as in the prior art arrangement. All of the gears 19, 20 and 21 are identical to those used in the driving of the magneto on the prior art mounting illustrated in Figure 1.

The idler gear 20 is mounted to my magneto mount 7 by a stub shaft 22 in the same location that it is mounted to the shaft 22' of the prior art mount 4. The shaft 22 is locked within the hub 23 by a suitable washer 24 and locking nut 25. An oil passage 26 is cored into the flange 9 of the mounting 7, extending to the bearing of the hub 23 and having a laterally extending port 26' opening through the face of the flange 9. The port 26' is positioned to communicate with the pressure feed port 27 located within the timing gear plate 3. The oil delivered from the motor under pressure is forced through the feed port 27 to the port 26' and into the passage 26, and to bearing 23, from which it is delivered through the piping 28 to the compressor 16 at 29 and is forced through the compressor bearings in the present well known manner.

The delivering of the oil pressure from the motor through my mount into the compressor is one of the features of my invention. The magneto mount 8 supports the magneto 30 which was formerly supported by the mount 4 that was removed from the engine. The magneto is coupled to the shaft 18 of the compressor 16 at 31, in the usual manner, and is driven.

In the installation of the compressor, the magneto mount 4 that comes on the engine is simply removed and my unit 7 is bolted on in the exact position having been occupied by the mount 4.

When the compressor is installed it may have a gear 19 keyed thereon. The gear 20 may also be supplied with my new and improved unit mount so that these gears will fit right in where the old mounting assembly had been removed, including its gears. The magneto is then bolted in place upon the mount 8 at 32 and hooked up to the compressor as above described.

It will be noted in Figures 3 and 4 that the compressor is set at an angle to the vertical line of the motor. The object of setting the compressor at an angle is to avoid interference with the generator 33.

I do not wish to be limited to the exact mechanical structure as shown and described, as other equivalents may be substituted still coming within the scope of my claims.

What I claim as new is:

1. An air compressor attachment for tractor engines of the type having a timing gear casing mounted to the engine block and a magneto supported by said casing and driven from the timing gears, said attachment comprising a unit to be substituted for the conventional magneto mount and including a plate to be removably secured to the timing gear casing, a tubular body portion fixed at one end to said plate, a flange at the other end of said tubular body portion to which a compressor may be secured, a depending extension on said flange, and a supporting arm removably attached to said extension and terminally provided with a support for a magneto in alignment with said tubular body portion.

2. An air compressor attachment for tractor engines of the type having a timing gear casing mounted to the engine block and a magneto supported by said casing and driven from the timing gears, said attachment comprising a unit to be substituted for the conventional magneto mount, and including a plate to be removably secured to the timing gear casing, a tubular body portion fixed at one end to said plate, a flange at the other end of said tubular body portion, means for removably securing a compressor to said flange in alignment with said tubular body portion, a depending extension on said flange, and a supporting arm removably attached to said extension and terminally provided with means for supporting a magneto in alignment with said tubular body portion.

3. An air compressor attachment for tractor engines of the type having a timing gear casing mounted to the engine block and a magneto supported by said casing and driven from the timing gears, said attachment comprising a unit to be substituted for the conventional magneto mount and a compressor removably supported thereby, said unit including a plate to be removably secured to the timing gear casing, a tubular body portion fixed at one end to said plate, a flange at the other end of said tubular body portion, means for removably securing said compressor to said flange in alignment with said tubular body portion, a depending extension on said flange, and a supporting arm removably attached to said extension and terminally provided with means for supporting a magneto in axial alignment with said compressor.

4. An air compressor attachment for tractor engines of the type having a timing gear casing mounted to the engine block and a magneto supported by said casing and driven from the timing gears, said attachment comprising a unit to be substituted for the conventional magneto mount and a compressor removably supported thereby, said unit including a plate to be removably secured to the timing gear casing, a tubular body portion fixed at one end to said plate, a flange at the other end of said tubular body portion, means for removably securing said compressor to said flange with its shaft extending through said tubular body portion and protruding beyond said plate so that it will extend into said gear casing when said plate is attached thereto, a depending extension on said flange, a supporting arm removably attached to said extension and terminally provided with means for supporting a magneto with its shaft in alignment with said compressor shaft, means for coupling said shafts together, a stub shaft journalled in said plate and protruding therefrom to extend into said gear casing, a gear keyed to the protruding end of said stub shaft for meshing engagement with the engine timing gears, and a gear keyed to the protruding end of said compressor shaft and in mesh with said stub shaft gear.

5. An attachment as defined in Claim 4 wherein an oil passage extends from an opening at one edge of said plate into said plate to the stub shaft journal, a port extends laterally from said passage through the face of said plate for juxtaposition with a pressure supply port in said gear casing, and a feed line extends from the open end of said passage to said compressor.

MILO WHITED.

REFERENCES CITED

The following references are of record in the file of this patent:

UNITED STATES PATENTS

| Number | Name | Date |
|---|---|---|
| 2,353,231 | Ginn | Oct. 9, 1941 |
| 2,373,341 | Rowe | May 5, 1942 |